(12) United States Patent
Gerasimov

(10) Patent No.: US 7,715,144 B2
(45) Date of Patent: May 11, 2010

(54) TRACK ERROR MEASUREMENT AND RECOVERY

(75) Inventor: Anton Gerasimov, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/059,709

(22) Filed: Mar. 31, 2008

(65) Prior Publication Data

US 2009/0244751 A1    Oct. 1, 2009

(51) Int. Cl.
G11B 21/02 (2006.01)
G11B 5/596 (2006.01)
(52) U.S. Cl. .................. 360/75; 360/77.08
(58) Field of Classification Search .......... None
See application file for complete search history.

(56) References Cited

U.S. PATENT DOCUMENTS

| | | | |
|---|---|---|---|
| 6,771,441 B2 | 8/2004 | Tang | |
| 7,054,096 B1 | 5/2006 | Sun et al. | |
| 7,154,690 B1* | 12/2006 | Brunnett et al. | 360/60 |
| 7,430,092 B2* | 9/2008 | Abe et al. | 360/77.11 |
| 2005/0157416 A1* | 7/2005 | Ehrlich et al. | 360/31 |
| 2007/0139809 A1 | 6/2007 | Liikanen et al. | |
| 2007/0211369 A1 | 9/2007 | Yang et al. | |
| 2007/0247737 A1 | 10/2007 | Manzer | |
| 2009/0086364 A1* | 4/2009 | Gerasimov | 360/77.04 |

* cited by examiner

Primary Examiner—Andrew L Sniezek
(74) Attorney, Agent, or Firm—Schwegman, Lundberg & Woessner, P.A.

(57) ABSTRACT

A method of measuring a track value is shown. The track value is related to track mis-registration, and is compared to a track value limit to assess a condition of the track. In example embodiments, the track value is determined as a function of multiple position error signals from previous wedges in the track. During a self servo writing operation, the track value and the track value limit are used to selectively perform a recovery action. In example embodiments, the track value limit is dynamically adjusted.

10 Claims, 6 Drawing Sheets

TRACK ERROR MEASUREMENT AND RECOVERY

BACKGROUND

A disk drive is an information storage device. A disk drive includes one or more disks clamped to a rotating spindle and at least one head for reading information representing data from and/or writing data to the surfaces of each disk. The head is supported by a suspension coupled to an actuator that may be driven by a voice coil motor. Control electronics in the disk drive provide electrical signals to the voice coil motor to move the head to desired positions on the disks to read and write the data in tracks on the disks.

Servo wedges are commonly written onto a disk surface to locate the read/write head on the disk surface during operation. Because tracks are never absolutely perfect circles on a disk, an amount of track mis-registration (TMR) is measured, and used to evaluate a number of operations in a drive such as quality of self-servo writing. Another use for TMR data includes evaluation of a wedge offset reduction field. It is desirable to obtain a measure of TMR that provides the most useful statistical information about the track for a given drive function such as self-servo writing, wedge offset reduction, etc.

DETAILED DESCRIPTION

Hereinafter, example embodiments of the present invention will be described with reference to the drawings.

Figure 1:
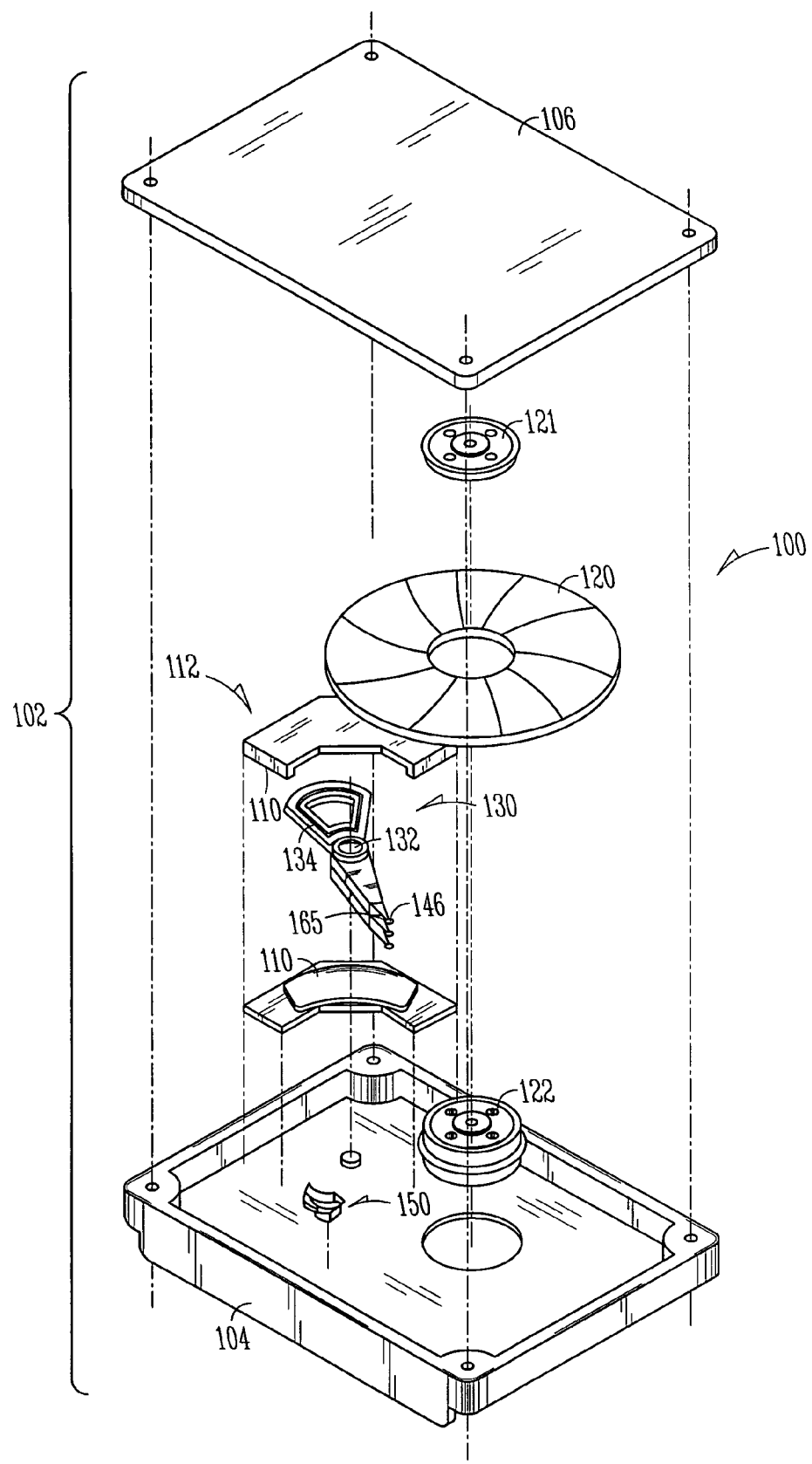
FIG. 1 is an exploded view of a magnetic recording and reproducing apparatus (hard disk drive) according to an example embodiment.

FIG. 1 is an exploded view of disk drive 100 that uses various embodiments of the present invention. A housing 102 is shown that includes a housing base 104 and a housing cover 106. The housing base 104 illustrated is a base casting, but in other embodiments a housing base 104 can comprise separate components assembled prior to, or during assembly of the disk drive 100. The disk 120 is attached to the hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes separate read elements and write elements. For example, the separate read element can be a magneto-resistive head, also known as an MR head. It will be understood that multiple head 146 configurations can be used. The transducing head 146 is associated with a slider 165.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132. It is accelerated in one direction when current of a given polarity is passed through the voice coil 134 and is accelerated in an opposite direction when the given polarity is reversed, allowing for control of the position of the actuator 130 and the attached transducing head 146 with respect to the disk 120. The VCM 112 is coupled with a servo system that uses positioning data read by the transducing head 146 from the disk 120 to determine the position of the transducing head 146 over one of a plurality of tracks on the disk 120. The servo system determines an appropriate current to drive through the voice coil 134, and drives the current through the voice coil 134 using a current driver and associated circuitry. The servo system can also be used to determine excessive accelerations in axes which are parallel to the surface of the disk 120.

One type of servo system is an embedded servo system in which tracks on each disk surface used to store information representing data contain small segments of servo information. It should be noted that in actuality there may be many more servo wedges than as shown in FIG. 1. Although a single disk 120 is shown for ease of illustration, a drive 100 may include two or more disks 120.

Figure 2:
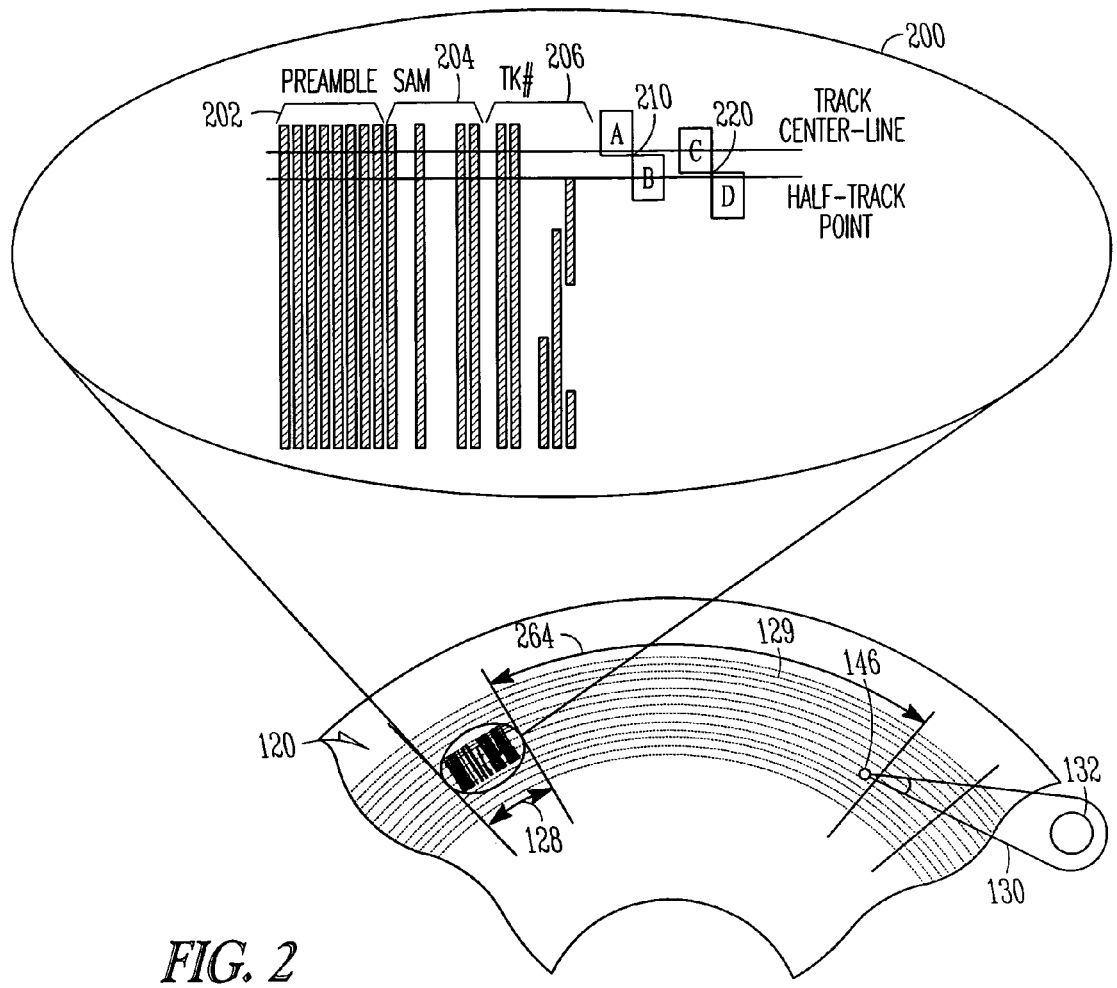
FIG. 2 is a partial detailed view of a disk from the disk drive shown in FIG. 1 that includes a servo pattern, according to an example embodiment.

FIG. 2 shows a portion of a disk 120 having at least one servo wedge 128. Each servo wedge 128 includes information stored as regions of magnetization or other indicia, such as optical indicia. Servo patterns 200 contained in each servo wedge 128 are read by the transducing head 146 as the surface of the spinning disk 120 passes under the transducing head 146. The servo patterns 200 can include information which can be used to identify a data sector contained in a data field 264. For example, the servo pattern 200 can include digital information such as a preamble 202, a servo address mark (SAM) 204, a track identification number 206. The servo pattern 200 also includes a set of servo bursts. As shown in the example of FIG. 2, a set of servo bursts may include an A servo burst, a B servo burst, a C servo burst, and a D servo burst. In this example, there is a servo burst edge 210 between the A burst and the B burst, and a servo burst edge 220 between the C burst and the D burst. The pattern shown in this example is a quadrature type pattern. In some embodiments, a disk drive will include a single column of each type of servo burst in each servo wedge 128. Each column corresponds to a radial of the disk. In some embodiments, the servo wedge 128 will also include other information such as a wedge number. This can be a single bit to designate an index wedge (wedge #0), or the SAM may be replaced by another pattern (referred to as a servo index mark or SIM), or the wedge may contain a few low-order bits of the wedge number or a complete wedge number.

Figure 3:
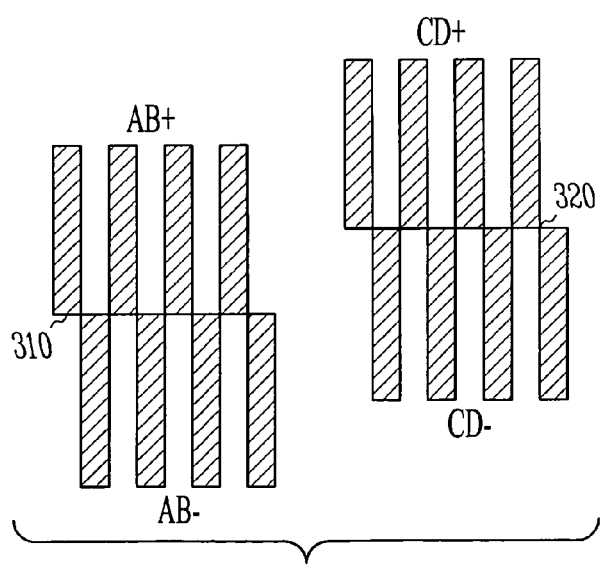
FIG. 3 is a representation of another arrangement of servo bursts, according to an example embodiment.

There are many different patterns for servo bursts. FIG. 3 shows another servo burst pattern which is associated with a null pattern. This pattern shows four servo bursts and it should be understood that this may also be repeated in columns so as to produce several radial lines of AB+, AB−, CD+ and CD− bursts on the disk in each servo wedge, such as servo wedge 128, on the disk. The servo burst pattern results in a servo burst edge 310 between the AB+ and AB− servo bursts, and a servo burst edge 320 between the CD+ and CD− servo bursts in the null pattern.

In an example drive, one of the burst edges may be at the center of a track or at a known distance from the center of the track. In one example the servo pattern is read and demodulated and the distance from a selected servo burst edge is determined. A position error signal (PES) indicative of the distance from the track center or the servo burst edge is generated and used to move the read head or write head to a position over the center of the desired track.

PES data is used for a number of operations in a hard drive. One such operation is during a self-servo write operation. In a self servo-write operation, servo wedges 128 are written by the hard drive during a stage of manufacture. The servo wedges 128 that are written in this process are later used for data operations such as reading and writing. In an example self servo writing operation, successive tracks are written with an associated number of servo wedges per revolution, depending on the number of wedges desired. In one example the successive tracks are written from a disk ID towards a disk OD, although the invention is not so limited. It is desirable to monitor accurate placement and geometry, etc. of each successive track to ensure that the final written tracks are within acceptable tolerance limits.

Figure 4:
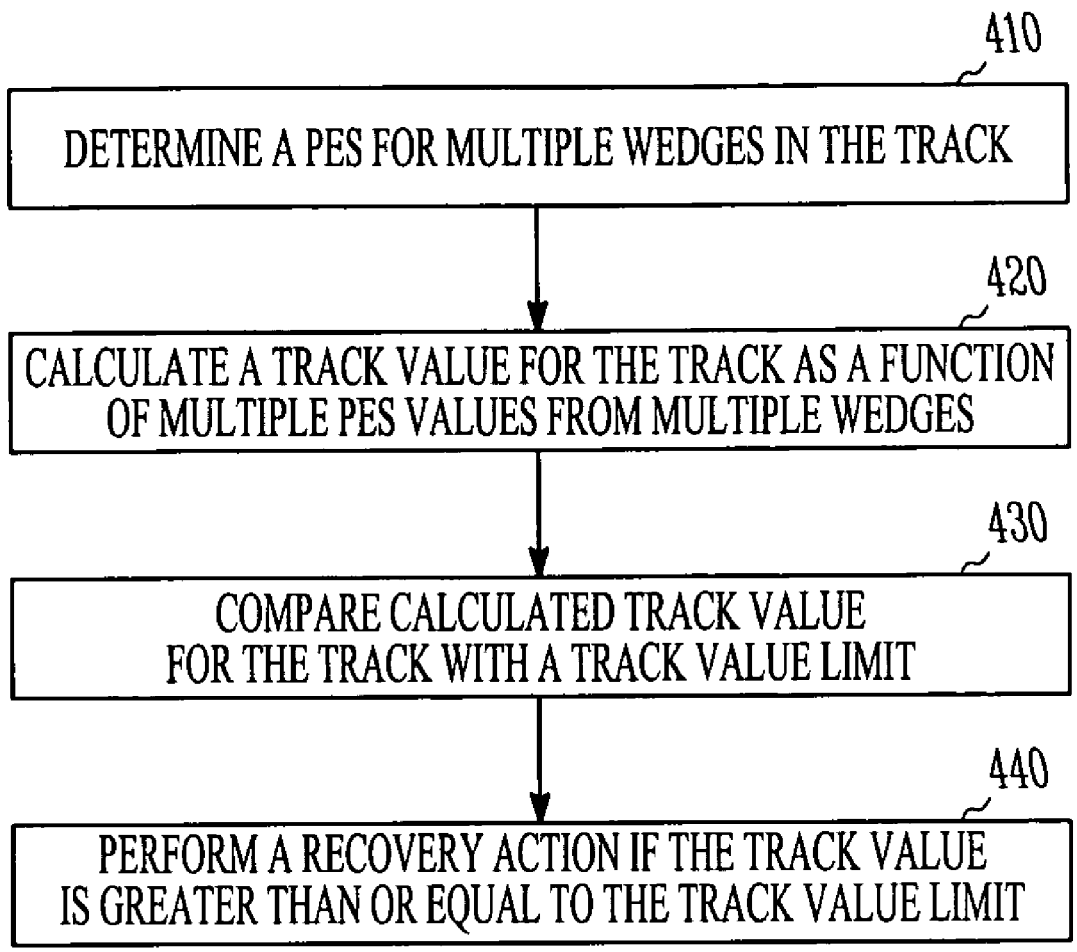
FIG. 4 is a flow chart of a method of self servo writing according to an example embodiment.

FIG. 4 illustrates an example method of using PES data in a self servo writing operation to monitor accurate placement and geometry, etc. of each successive track according to one embodiment of the invention. In operation 410, a PES number is determined for multiple individual wedges in a track during a self servo writing operation. In one example, the multiple PES values include all PES values for the number of wedges in a single revolution of the disk. Other embodiments using multiple PES values, but fewer than all wedges in a single revolution are also within the scope of the invention.

In operation 420, a track value is calculated as a function of multiple PES values from multiple wedges. By using multiple PES wedge data, the resulting track value gives a more useful figure of merit for the entire track, not just an individual wedge. One example of a track value that is a function of multiple PES values from multiple wedges includes a sum of the squares of each individual PES value such as in the equation:

$$trackvalue = (PES_1)^2 + (PES_2)^2 + (PES_n)^2$$

Another possible function of multiple PES values include a square root of the quantity of summed squares of the individual PES values such as in the equation:

$$trackvalue = \sqrt{(PES_1)^2 + (PES_2)^2 + (PES_n)^2}$$

Yet another possible function of multiple PES values include a root mean square of individual PES values such as in the equation:

$$trackvalue = \sqrt{\frac{(PES_1)^2 + (PES_2)^2 + (PES_n)^2}{n}}$$

Yet another possible function of multiple PES values includes three times a root mean square of individual PES values such as in the equation:

$$trackvalue = 3 \cdot \sqrt{\frac{(PES_1)^2 + (PES_2)^2 + (PES_n)^2}{n}}$$

One of ordinary skill in the art, having the benefit of the present disclosure will recognize that a number of functions of multiple PES values are possible, and useful to better describe a track during a self servo writing operation. Functions such as a sum of squares of multiple PES values or functions that are related to a sum of squares are useful because they are scalable to a quantity known as track misregistration (TMR). Although a 3σ TMR is statistically a useful value to quantify TMR, by eliminating mathematical operations such as multiplying by 3, dividing by the number of wedges (n), etc, a track value that is directly related to TMR is determined, without the additional processor time for operations such as multiplying by 3, dividing by (n), etc.

Figure 5:
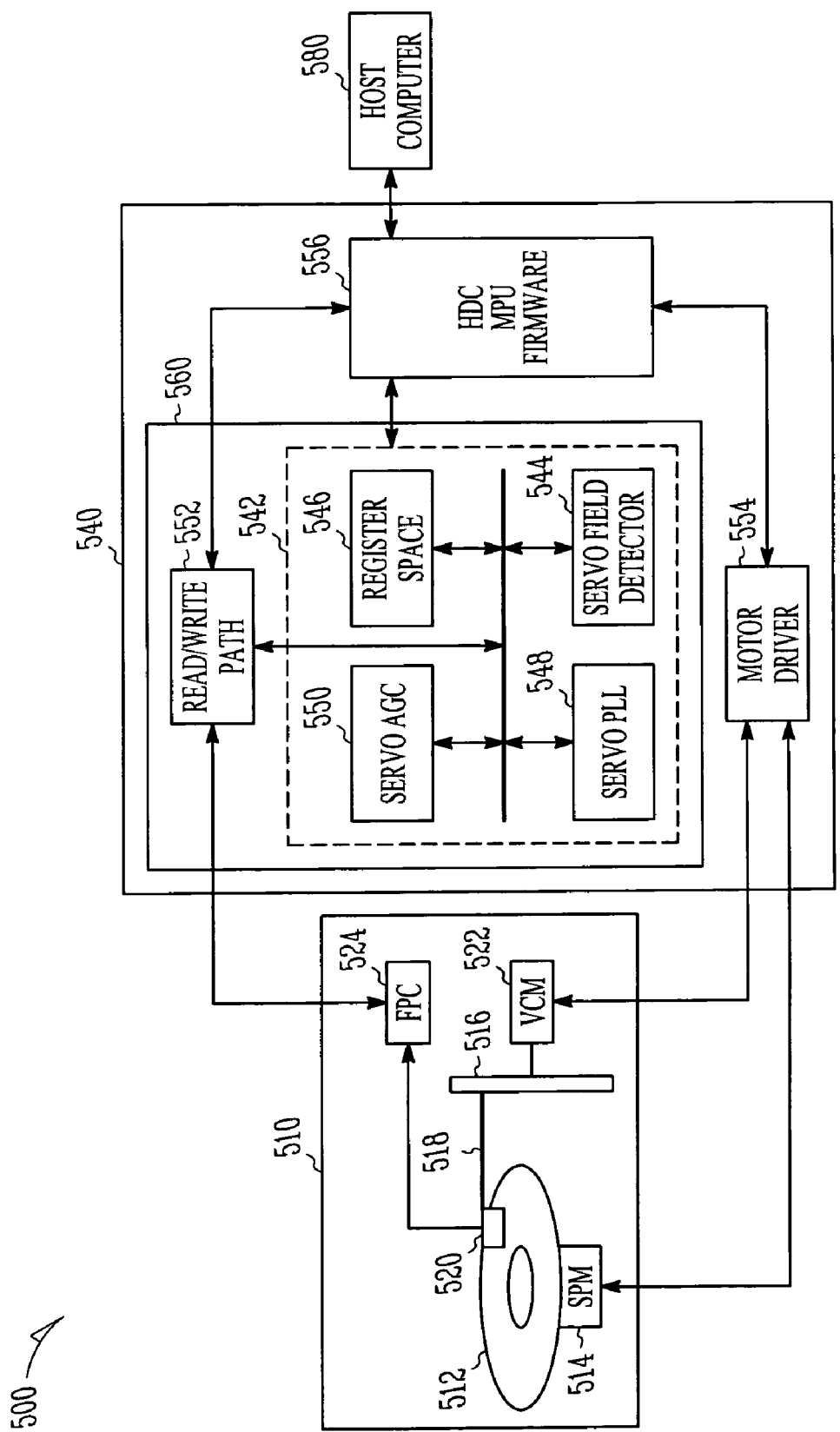
FIG. 5 is a block diagram of a hard disk drive according to an example embodiment.

Operation 430 of FIG. 5 recites comparing the calculated track value with a track value limit. As described above, the track value is related to a TMR based on multiple PES values. By comparing the track value to an acceptable, predetermined track value limit, each track is successively evaluated to determine if it is within acceptable positional and geometric tolerances; In one embodiment, the track value limit is the same for all written tracks. In other embodiments, the track value limit is varied for different tracks.

One example of varying the track value limit includes having a more tightly controlled limit at or near an ID of the disk and varying the track value limit to a less tightly controlled limit at or near an OD of the disk. In many instances, it is physically easier to control positioning, geometry, etc of a track near an ID of a disk. Therefore in one example, a more tightly controlled track value limit can be maintained at or near the ID during a self servo writing operation. Likewise, it is physically more difficult to control positioning, geometry, etc of a track near an OD of a disk. Therefore in one example, a more loosely controlled track value limit is maintained at or near the OD during a self servo writing operation.

Another example of varying the track value limit includes dynamically tightening the track value limit for drives that are exhibiting tight tolerances during the self servo operation. Conversely an example of varying the track value limit includes dynamically loosening the track value limit for drives that are exhibiting larger variations during the self servo operation.

One method of evaluating a drives tolerance during a self servo writing operation includes checking the track values for previous tracks (calculated using example functions as described above). Because the calculated track values are directly related to TMR, the track values indicate how close to tolerances each individual drive is operating during the self servo writing operation. One example of evaluation as the self servo writing progresses includes averaging track values for a quantity of previous tracks. If the track values are all low enough, then the track value limit can be adjusted downward to a tighter control. Likewise, if the track values are all higher, then the track value limit can be adjusted out to a more loosely controlled standard. Although averaging pervious track values is discussed, other mathematical operations are also within the scope of the invention, such as low pass filtering, etc.

Operation 440 recites performing a recovery action if the track value is greater than or equal to the track value limit. By performing a recovery action immediately once a track is determined to be out of acceptable ranges, the track can be fixed, and unacceptable track mis-registration values are not propagated to subsequent tracks in the self servo writing operation.

One example of a recovery action includes re-writing the track. Another example of a recovery action includes first erasing, then re-writing the track. Other recovery actions or combinations of recovery actions are also within the scope of the invention.

FIG. 5 shows a block diagram of a disk drive 500 similar to the drive shown in FIG. 1, containing a disk with servo information such as described in FIGS. 2 and 3. In one example, the disk drive 500 includes instructions stored within a media in the hard drive 500 to perform self servo writing operations as described regarding FIG. 4 above. In another example, the instructions are stored within a media that is external to the hard drive 500, and the instructions are only accessed during a self servo writing operation.

Although an example is shown, one of ordinary skill in the art, having the benefit of the present disclosure, will recognize that other device and circuit configurations than those shown in FIG. 5 are possible, and within the scope of the present invention. This Figure shows the head slider 520 only above the top surface of the magnetic disk 512. However, in one example, the magnetic recording layer is formed on each side of the magnetic disk. A down head and an up head may be provided above the bottom and top surfaces of the magnetic disk, respectively. The disk drive includes a main body unit called a head disk assembly (HDA) 510 and a printed circuit board (PCB) 540.

As shown in FIG. 5, the HDA 510 has the magnetic disk 512, the spindle motor 514, which rotates the magnetic disk 512, the head slider 520, including the read head and the write head, the suspension/actuator arm 518, the VCM 522, and a head amplifier, which is not shown. The head slider 520 is provided with a read head including a read element, such as a giant magnetoresistive (GMR) element and a write head.

The head slider 520 may be elastically supported by a gimbal provided on the suspension/actuator arm 518. The suspension/actuator arm 518 is rotatably attached to the pivot 516. The VCM 522 generates a torque around the pivot 516 for the suspension/actuator arm 518 to move the head in the radial direction of the magnetic disk 512. The circuitry from the suspension/actuator arm 518 is connected to the PCB 540 via a flexible cable 524.

As described above, the magnetic recording layer is formed on each side of the magnetic disk 512, and servo wedges, each shaped like a circular arc, are formed so as to correspond to the locus of the moving head. In one example the radius of a circular arc formed by a servo wedge is given as the distance from the pivot to the magnet head element.

In the illustrated example, several major electronic components, so-called system LSIs, are mounted on the PCB 540. The system LSIs include a controller 554, a read/write channel IC 560, and a motor driver IC 554. The controller 554 in one example includes a disk controller (HDC) and an MPU, and firmware. The MPU is a control unit of a drive system and includes ROM, RAM, CPU, and a logic processing unit that implements a head positioning control system according to the present example embodiment. The logic processing unit is an arithmetic processing unit comprised of a hardware circuit to execute high-speed calculations. Firmware for the logic processing circuit is saved to the ROM or elsewhere in the disk drive. The MPU controls the drive in accordance with firmware.

The disk controller 554 is an interface unit in the hard disk drive which manages the whole drive by exchanging information with interfaces between the disk drive and a host (for example, a personal computer, portable music player, etc.) and with the MPU, read/write channel IC 560, and motor driver IC 554.

The read/write channel IC 560 is a head signal processing unit relating to read/write operations. The read/write channel IC 560 is shown as including a read/write path 552 and a servo demodulator 542. The read/write path 552, which can be used to read and write user data and servo data, may include front end circuitry useful for servo demodulation. The read/write path 552 may also be used for self-servo writing. It should be noted that the disk drive also includes other components, which are not shown because they are not necessary to explain the example embodiments.

The servo demodulator 542 is shown as including a servo phase locked loop (PLL) 548, a servo automatic gain control (AGC) 550, a servo field detector 544 and register space 546. The servo PLL 548, in general, is a control loop that is used to provide frequency and phase control for the one or more timing or clock circuits (not shown in FIG. 5) within the servo demodulator 542. For example, the servo PLL 548 can provide timing signals to the read/write path 552. The servo AGC 550, which includes (or drives) a variable gain amplifier, is used to keep the output of the read/write path 552 at a substantially constant level when servo wedges on one of the disks 512 are being read. The servo field detector 544 is used to detect and/or demodulate the various subfields of the servo wedges, including a SAM (Servo Address Mark), a track number, a first servo burst, and a second servo burst. The MPU is used to perform various servo demodulation functions (e.g., decisions, comparisons, characterization and the like) and can be thought of as being part of the servo demodulator 542. In the alternative, the servo demodulator 542 can have its own microprocessor.

One or more registers (e.g., in register space 546) can be used to store appropriate servo AGC values (e.g., gain values, filter coefficients, filter accumulation paths, etc.) for when the read/write path 552 is reading servo data, and one or more registers can be used to store appropriate values (e.g., gain values, filter coefficients, filter accumulation paths, etc.) for when the read/write path 552 is reading user data. A control signal can be used to select the appropriate registers according to the current mode of the read/write path 552. The servo AGC value(s) that are stored can be dynamically updated. For example, the stored servo AGC value(s) for use when the read/write path 552 is reading servo data can be updated each time an additional servo wedge is read. In this manner, the servo AGC value(s) determined for a most recently read servo wedge can be the starting servo AGC value(s) when the next servo wedge is read.

The read/write path 552 includes the electronic circuits used in the process of writing and reading information to and from the magnetic disks 512. The MPU can perform servo control algorithms, and thus, may be referred to as a servo controller. Alternatively, a separate microprocessor or digital signal processor (not shown) can perform servo control functions.

Although a particular block diagram of a disk drive 500 is shown and described as an example the invention is not so limited. One of ordinary skill in the art, having the benefit of the present disclosure will recognize that other configurations of circuit components, arrangements, etc. are within the scope of the invention.

Figure 6:
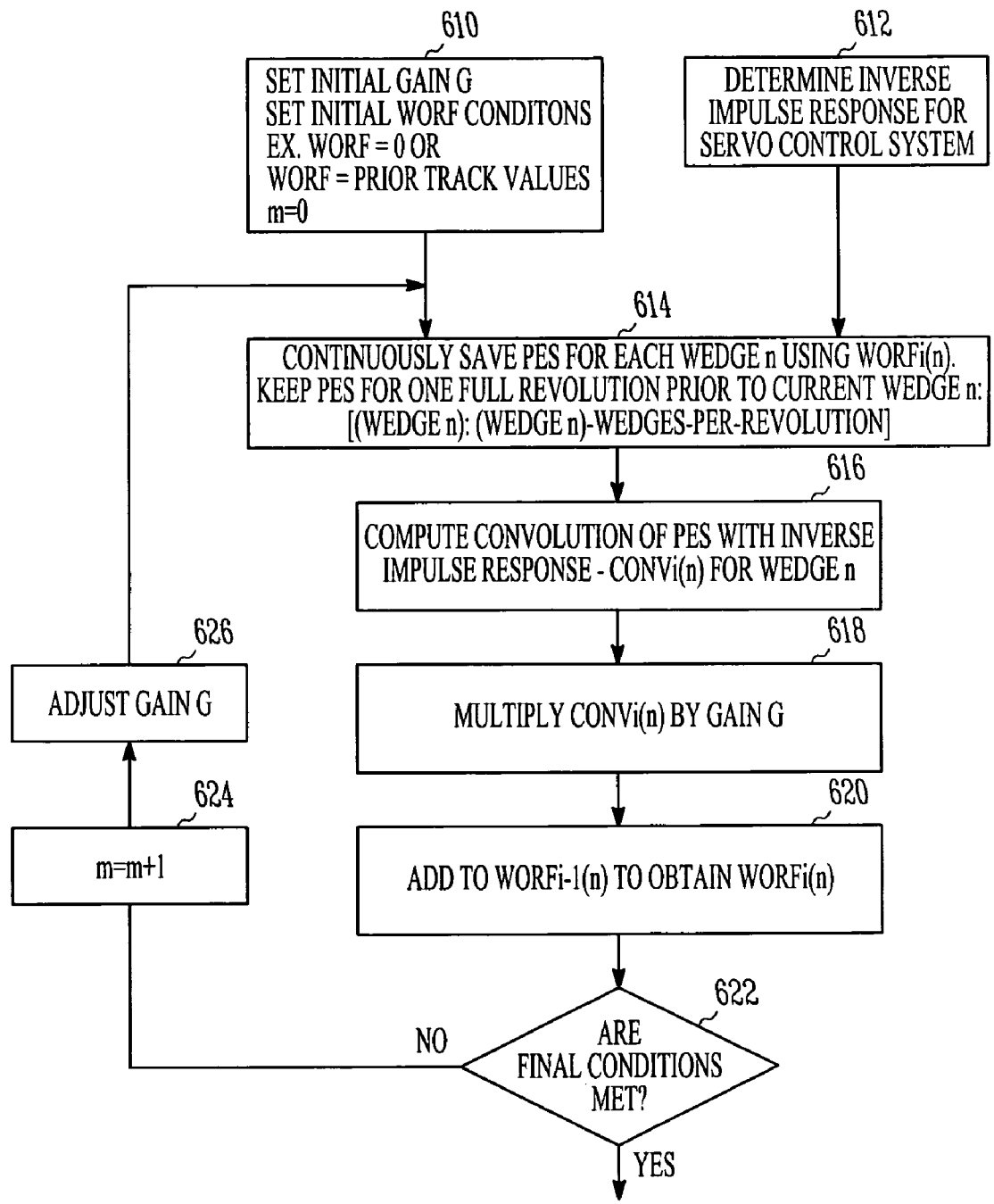
FIG. 6 is a flow chart of a method to determine a track correction factor according to an example embodiment.

FIG. 6 is a flow chart of a method 600 for determining an additional track correction factor according to an embodiment of the invention. In one example an additional track correction factor includes data in a wedge offset reduction field (WORF). An example WORF value according to an embodiment of the invention, is an error correction value for the written in run out associated with the written servo pattern at the servo wedge. The method 600 includes a determination of an inverse impulse response function of the servo control system 610. The method 600 also includes the setting of initial gain and initial WORF values 612 for each invocation of the method 600. The initial WORF value can be set either to zero when there are no other WORF values. In the alternative, the initial WORF value can be set to a non-zero values, such as final WORF value from the previous track, if the written in repeatable run out (WRRO) is known to be similar for adjacent track locations. The initial WORF value could also be the WORIF value determined for the immediately prior servo wedge on the same track.

The method 600 also includes continuously saving the PES for each servo wedge around a track 614. These values are used to perform the convolution of all the PES values to as part of determining the WRRO associated with the servo information of the servo wedge. More specifically, the PES for each wedge n using $WORF_{i(n)}$ for an "ith" revolution is stored in a buffer. The PES values associated with the wedges in one full revolution prior to the current wedge n are stored in the buffer.

In one embodiment, the decoded PES is continuously saved for each servo wedge around a track into a circular buffer. Using a circular buffer, all the values for the PES associated with each of the wedges around the disk for a certain track can be retrieved from the circular buffer. In the method 600, the WORF value for an individual servo wedges n is then computed as a circular convolution (denoted as CONVi(n)) of PES for the last revolution prior to next servo wedge using the inverse impulse response of the system, as depicted by reference number 616.

The method 600 also includes multiplying the circular convolution, CONVi(n), by a variable gain G, as depicted by reference number 618. Variable gain G, in some embodiments, is a function of the number of wedges m processed from the start of current WORF computation procedure. The gain G may also be a function of the level track misregistration (TMR) or repeatable run out (RRO) achieved during the current WORF procedure. Higher current levels of TMR or RRO may justify higher gain G values while lower levels of TMR or RRO may justify lower gain G values. Gain G could also be a function of current revolution number equal to $G=1/(Rev)$ or $G=1/(Rev+1)$, where Rev is the number of full disk revolutions from the start of the current WORF computation procedure. Other functions are possible as well. The value of the gain should be decreasing for higher processed wedge numbers m to ensure reduced effects of nonrepeatable run out (NRRO) and convergence of WORF values to the correct estimates of WRRO of the servo track. This variable gain iterative procedure is less sensitive to impulse response measurement and/or modeling errors and to non-linearities of the control system and PES decoding.

$WORFcurrent(n)=CONVi(n)*G$

The calculated WORF value for the current wedge n is then added to the existing WORF values, as depicted by reference number 620, and will be used as WORF correction next time PES for wedge n is calculated. This element is also shown by the mathematical relationship set forth below:

$WORFi(n)=WORFcurrent(n)+WORFi-1(n)$

Next, a decision tree is used to determine if the final conditions are met, as depicted by reference number 622. The final conditions for the method 600 are revolution number independent. In one embodiment, the WORF computation method 600 is terminated after the track value as described in embodiments above, such as in FIG. 4, is less than the track value limit.

Figure 7:
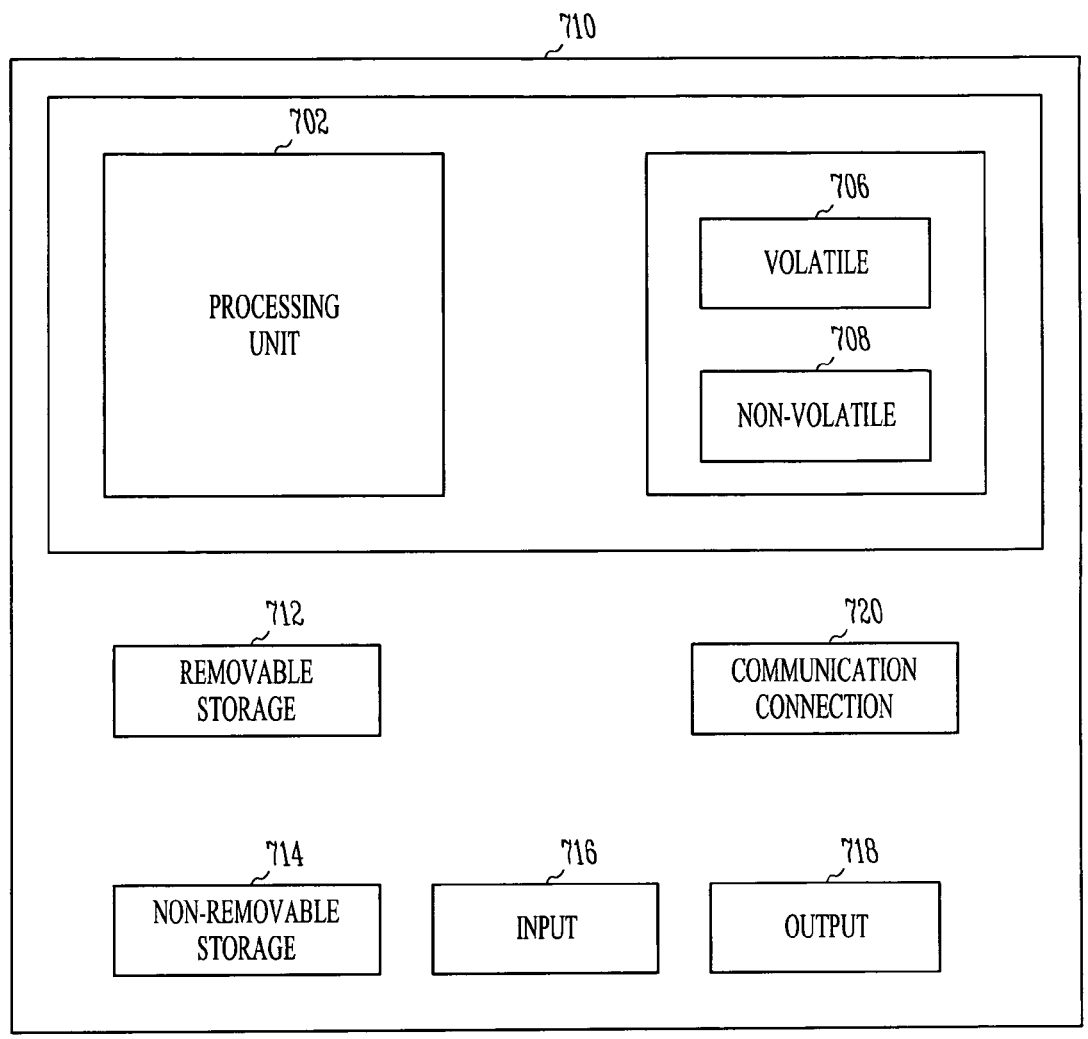
FIG. 7 is an example block diagram of a computer system for implementing methods and devices as described in accordance with example embodiments.

FIG. 7 is a block diagram of a computer system that in one embodiment executes the above method from FIG. 4. In one embodiment, the computer system includes a hard drive that includes instructions stored on a media within the hard drive to perform the method described above and shown in FIG. 4.

A general computing device 710, may physically include a processing unit 702, memory 704, removable storage 712, and non-removable storage 714. Memory 704 may include volatile memory 706 and non-volatile memory 708. The computing device 710 may not physically include, but have access through a network to a computing environment that includes, a variety of computer-readable media, such as volatile memory 706 and non-volatile memory 708, removable storage 712 and non-removable storage 714.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computing device 710 may include or have access to a computing environment that includes input 716, output 718, and a communication connection 720. One of the inputs could be a keyboard, a mouse, or other selection device. The communication connection 720 can also include a graphical user interface, such as a display. The computing device 710 may operate in a networked environment using a communication connection to connect to one or more remote devices. The remote device may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computing device 710. A hard drive, CD-ROM, flash memory, and RAM are some examples of articles including a computer-readable medium. For example, a computer program capable of executing a self servo writing operation according to the teachings of the present invention may be included. Further, a computer program may be stored on a computer-readable medium to determine a track correction factor such as wedge offset reduction field data.

The foregoing description of the specific example embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed example embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method comprising:
   self servo writing a track on a disk surface;
   determining a PES for multiple wedges in the track;
   calculating a track value for the track as a function of multiple PES values from multiple wedges;
   comparing the calculated track value for the track with a first track value limit;
   performing a recovery action based on the comparison; and
   modifying the track value limit as self servo writing progresses based on track values from multiple previous tracks.

2. The method of claim 1, wherein modifying the track value limit includes reducing the track value limit to a tightly controlled limit for drives exhibiting a high tolerance.

3. The method of claim 1, wherein modifying the track value limit includes increasing the track value limit to a loosely controlled limit for drives exhibiting a low tolerance.

4. The method of claim 1, wherein modifying the track value limit includes varying the track value limit from a tightly controlled limit at an inner diameter of the disk surface to a more loosely controlled limit at an outer diameter of the disk surface.

5. The method of claim 1, wherein modifying the track value limit as self servo writing progresses based on track values from multiple previous tracks includes modifying based on a low pass filter of track values from multiple previous tracks.

6. The method of claim 1, wherein modifying the track value limit as self servo writing progresses based on track values from multiple previous tracks includes modifying based on an average of track values from multiple previous tracks.

7. A hard disk drive system comprising:
   a hard disk;
   a read/write head to follow a track on the hard disk;
   computer readable instructions stored in a media and coupled to the hard disk drive system such that when executed, the instructions cause the read/write head to perform a number of operations, including:
   self servo writing a track on the hard disk;
   determining a PES for multiple wedges in the track;
   calculating a track value for the track as a function of multiple PES values from multiple wedges;
   comparing the calculated track value for the track with a track value limit;
   performing a recovery action based on the comparison; and
   modifying the track value limit as self servo writing progresses based on track values from multiple previous tracks.

8. The hard disk drive system of claim 7, wherein the computer readable instructions are stored in a media within the hard drive.

9. The hard disk drive system of claim 8, wherein the media includes flash memory.

10. The hard disk drive system of claim 7, further including computer readable instructions to iteratively calculate and refine wedge offset reduction field data, and computer readable instructions to terminate iterations once the track value is less than the track value limit.

* * * * *